Sept. 16, 1969     G. C. ROINESTAD     3,467,239
CENTRAL LINK COLLAPSIBLE CONVEYOR BELT
Filed Sept. 5, 1967     3 Sheets-Sheet 1
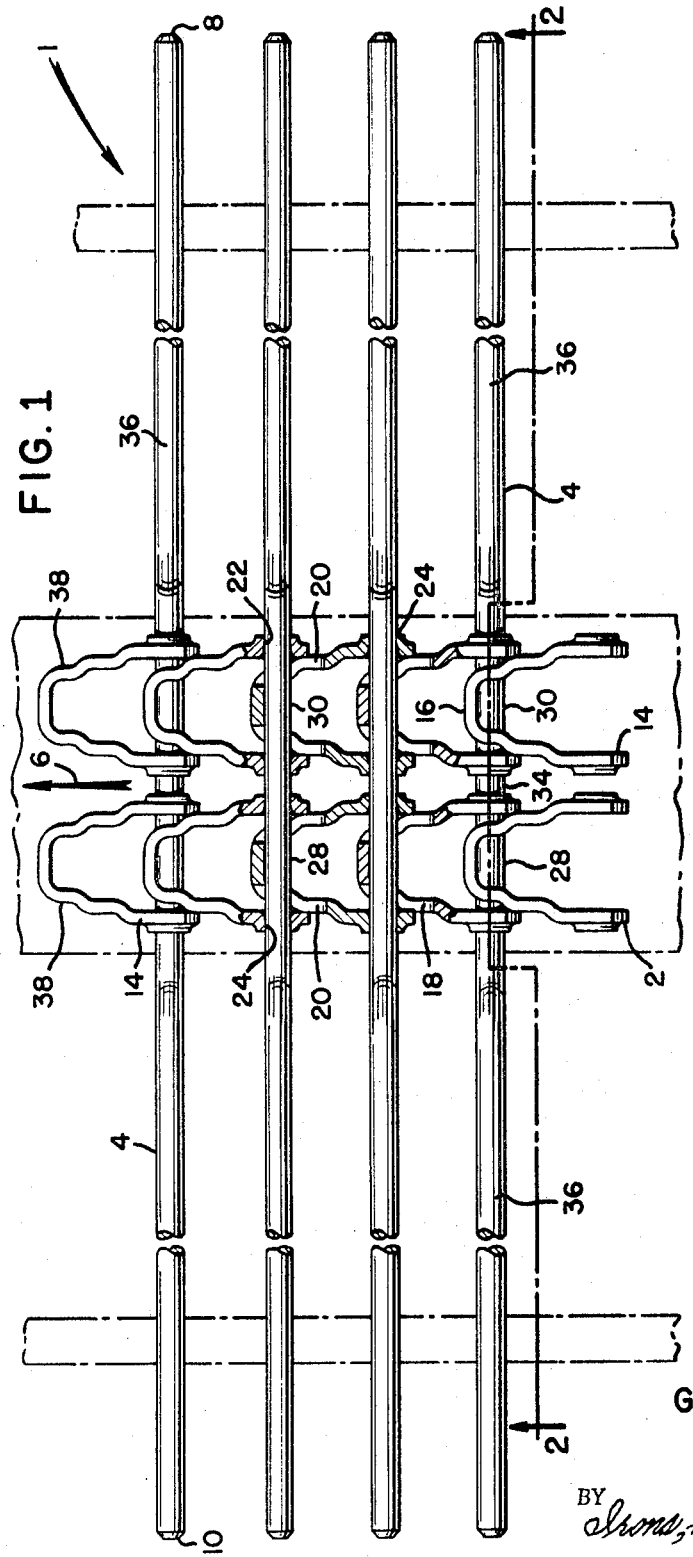
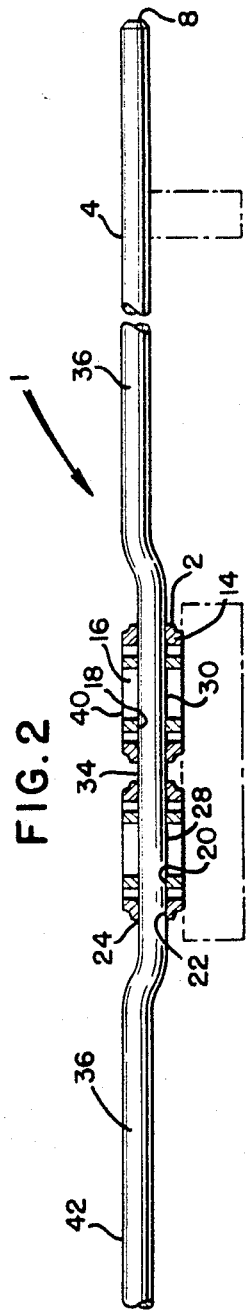
INVENTOR
GERALD C. ROINESTAD
ATTORNEYS

INVENTOR
GERALD C. ROINESTAD

Sept. 16, 1969　　　　G. C. ROINESTAD　　　　3,467,239
CENTRAL LINK COLLAPSIBLE CONVEYOR BELT
Filed Sept. 5, 1967　　　　　　　　　　　　3 Sheets-Sheet 3
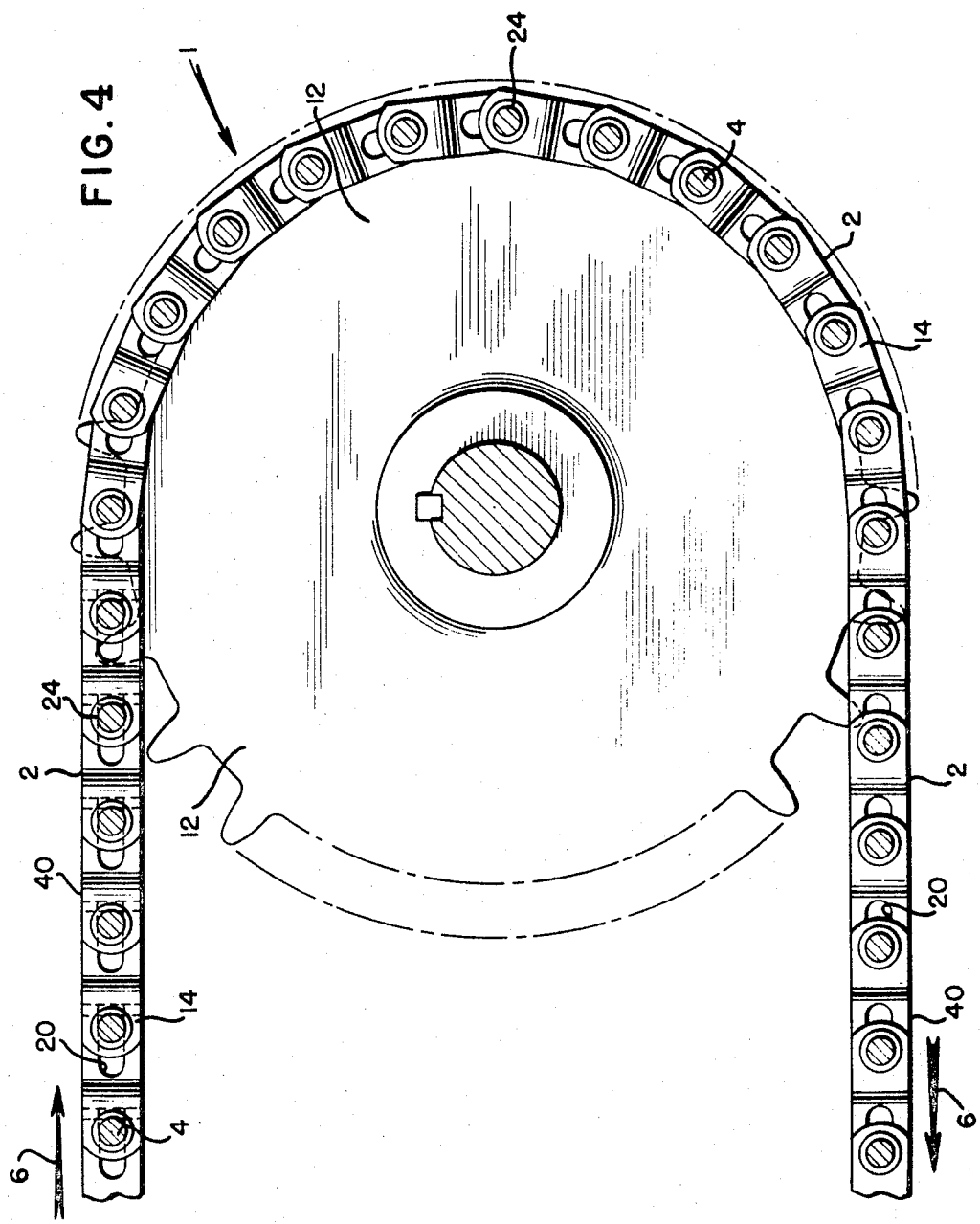
INVENTOR
GERALD C. ROINESTAD
BY *Irons, Birch, Swindler & McKie*
ATTORNEYS

United States Patent Office

3,467,239
Patented Sept. 16, 1969

3,467,239
CENTRAL LINK COLLAPSIBLE CONVEYOR BELT
Gerald C. Roinestad, Winchester, Va., assignor to Ashworth Bros. Inc., Winchester, Va., a corporation of Massachusetts
Filed Sept. 5, 1967, Ser. No. 665,602
Int. Cl. B65g 15/48
U.S. Cl. 198—195                                      12 Claims

ABSTRACT OF THE DISCLOSURE

A collapsible conveyor belt having at least one row of connecting links positioned centrally of said belt and extending longitudinally of the path of movement of said belt with rod members defining a conveying surface extending outwardly in opposed directions from said row transversely of said path and operatively connected to the individual links. The links are collapsible in a direction longitudinal of said path, individually pivotable both in a direction normal to the conveying surface and laterally in the plane of the conveying surface.

BACKGROUND OF THE INVENTION

Field of the invention

This invention relates to conveyor belts and more particularly to collapsible conveyor belts capable of movement along a straight path, about bends laterally of said path and about bends normal to the conveying path of the belt. More particularly, the invention relates to centrally linked belts which comprise a plurality of spaced rods connected by centrally located links and having free outer ends.

State of the prior art

The industrial application of conveyor belt systems is extremely diversified. While some conveyor systems are employed solely for the transporting of materials between two or a series of points, others are employed to convey materials while various operations are performed on the materials during conveyance. The latter systems have a wide range of requirements imposed by the nature of the operations performed in addition to those necessitated by the location of the desired entry and exit areas for the conveyed material. For example, freshly baked goods are often conveyed from ovens to a wrapping station with the requirement imposed upon the conveying system that the baked goods remain in transit for a period sufficient to permit the goods to cool to a degree that a wrapper may be applied.

Frequently, such conveyor courses include straight paths of conveyance either level or inclined, lateral bends also either horizontal or in a slightly inclined path and vertical bends normal to the surface of conveyance of the type generally associated with the return circuit of an endless conveyor belt. In addition, where foods or other materials are being conveyed for the purpose of cooling the material, it is extremely desirable to employ a conveyor belt of a substantially open character to permit the free circulation of a maximum amount of air about the goods to facilitate the cooling operation. Further and particularly in regard to the conveyance of food goods, it is absolutely necessary that the belt be of a relatively simple construction to facilitate cleaning to thereby maintain a highly sanitary condition.

While the prior art has provided a plurality of centrally linked rod conveyor belts, it has failed to develop a collapsible belt of this type characterized by a relatively simple construction, which is capable of meeting the varied demands imposed by the present day industrial processes. For instance, various prior art belts include elements defining conveying surfaces which are operatively connected to chain type linkages. These linkages are relatively pivotal about a vertical pivot element in order to obtain a traverse of a lateral or horizontal bend in a conveyor course. These conveyor belts normally are not movable about a vertical bend, nor are the belts collapsible in order to provide areas within the conveyor course of zero tension without the formation of slack loops and the like.

Other central link conveyor belts have employed extremely complicated link structures in order to effect both horizontal and vertical bends with one type of structure provided to facilitate the vertical bend and a second type of structure provided to facilitate the lateral bend. These central track conveyor belts are not of a collapsible nature. Further such belt structures are inappropriate for food handling where the complexity of such structures causes considerable difficulty in maintaining a sanitary environment.

In my United States Patent No. 3,225,898 there is disclosed a collapsible conveyor belt which employs a row of collapsible connecting links at each of the opposed extreme edges of the belt. This belt provides collapsibility along with the capability of traversing both vertical and horizontal bends in a conveyor course. That belt structure, however, requires a relatively large turning radius for effecting a lateral bend. Thus, though possessing the attribute of collapsibility, it is limited in its ability to traverse relatively compact conveyor courses for the conservation of working area within an industrial facility.

Summary of the invention

This invention encompasses a collapsible central link conveyor belt structure adaptable for open framework conveyor belts and employable on a compact circuitous conveyor course involving both vertical and sharp lateral or horizontal bends.

This conveyor belt structure is basically comprised of a plurality of connecting links which form at least one row of links centrally of the belt structure and extending longitudinally of the path of movement of the belt. The links have opposed end portions longitudinally of the path of movement of the belt and define a pair of spaced leg members directed generally longitudinally of said movement path. Each of the links also defines, at one end portion thereof, a slot therethrough transversely of said movement path and elongated longitudinally of said path. The links are disposed in partially nested relation with a portion of each link received between the leg members of a next adjacent link. These links may simply be comprised of a generally U-shaped member such as a bent flat wire having a pair of opposed spaced leg members interconnected by a base portion with the elongated slot comprised of a pair of aligned slots, one in each of the respective leg members.

The invention is further comprised of central rod means having an axis parallel to the plane of the belt for pivotably and slidably coupling each partially nested pair of adjacent links. This central rod means is received through the elongated slot of a first link and is connected to the adjacent link to provide a pivot pin or hinge about which the slotted link is free to rotate in a direction normal to the conveying surface and due to the freedom of sliding movement of the centrol rod means in the slot, also rotate laterally within the plane of the belt.

The conveyor belt having its connecting links so movable, further includes a plurality of outer rod means connected to the links to extend freely outwardly in both lateral directions from the central links to define the conveying surface so that the outer ends of the outer rod means are spaced apart during straight belt travel and may be collapsed into contiguous relationship during said lateral bending of the belt. The central and other rod means preferably are comprised of a single transversely extending rod member which passes through the elongated slot in one of the links and an aperture in its adjacent link with said rod being securely connected to said aperture defining link.

It is an object of this invention to alleviate the aforementioned difficulties in the art by providing a novel conveyor belt structure capable of meeting the varied demands of present day industrial processes.

It is a further object of this invention to provide a collapsible belt structure which is capable of traversing with relative ease both vertical and horizontal or lateral bends with a particular capability of traversing lateral bends of a small turning radius. The belt of this invention having the capability of traversing a lateral bend with a ratio of belt width to turning radius of 1:0.25 as compared to the ratio of a belt having collapsible links disposed in a row at each of its extreme side edges of 1:2.2.

Another object of this invention is to provide such a belt of a simple construction which is easy to clean thus facilitating the maintenance of a sanitary conveyor course on which food products and the like may be transported.

It is also an object of this invention to provide such a belt, having a relatively simple structure to thereby facilitate production and maintenance and decrease the costs attendant each.

It is a further object of this invention to provide such a conveyor belt having a relatively open conveying surface to facilitate the circulation of air through the belt and about goods carried on the belt.

Other objects and advantages of this invention will become apparent from the following description taken in connection with the accompanying drawings wherein preferred embodiment of this invention is set forth by way of illustration and example.

BRIEF DESCRIPTION OF THE DRAWINGS

FIGURE 1 is a fragmentary plan view showing a conveyor belt embodying the features of this invention on a straight portion of a conveyor course with portions of the connecting links broken away to illustrate the slot and aperture formed transversely through said links. The supporting structure for the conveyor belt is shown in phantom lines.

FIGURE 2 is a fragmentary vertical sectional view taken on line 2—2 of FIGURE 1. The supporting structure for the conveyor belt is shown in phantom lines.

FIGURE 4 is a fragmentary vertical sectional view illustrating the cooperative engagement of the conveyor belt with a sprocket wheel for effecting a vertical bend of the belt about said wheel.

CONVEYOR BELT

Figure 3:
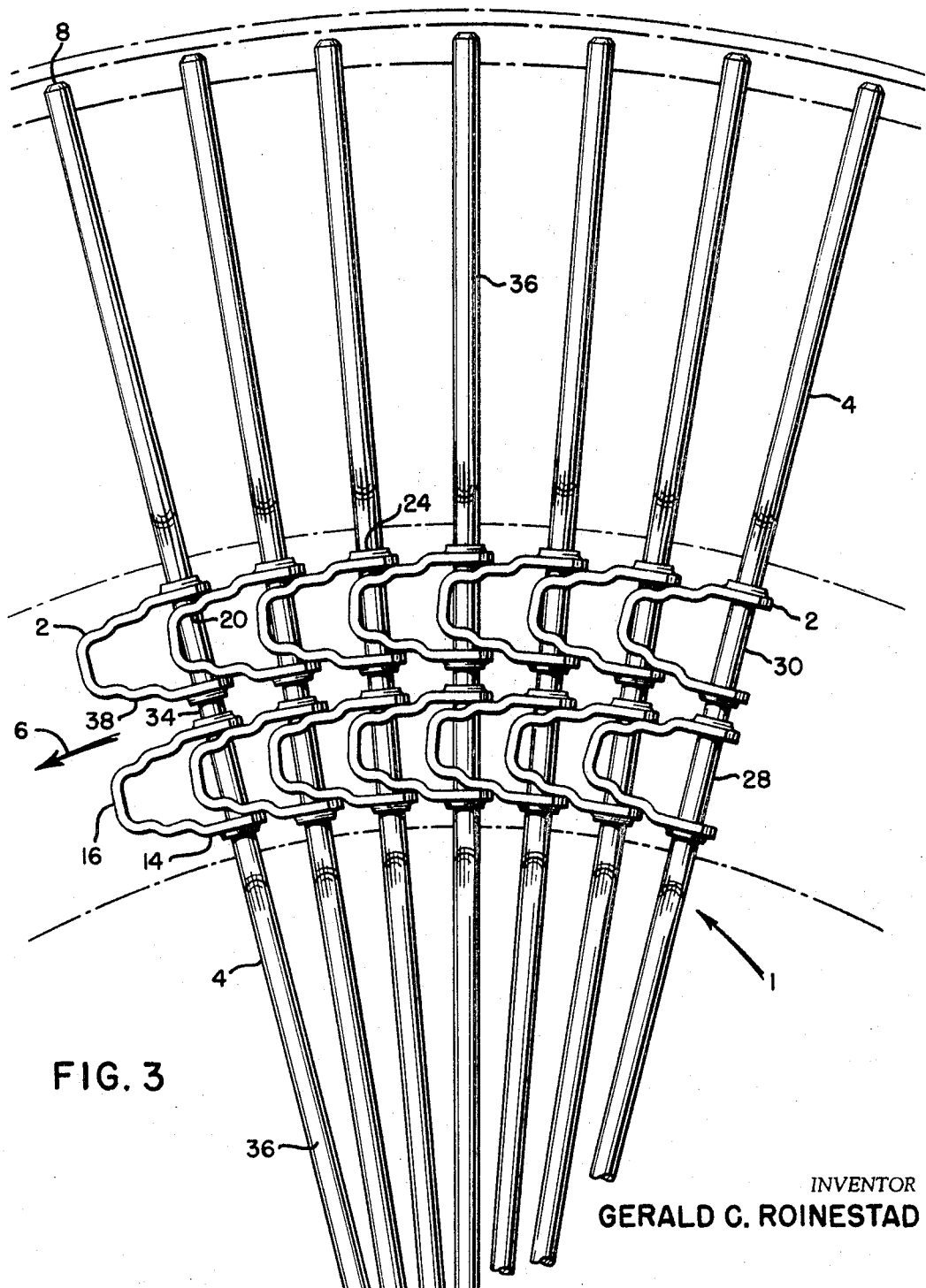
FIGURE 3 is a fragmentary plan view illustrating the belt as disposed on a horizontal or lateral bend in a conveyor course.

Referring to FIGURE 1, a collapsible conveyor belt which embodies the features of this invention is illustrated and is designated by the reference numeral 1. The conveyor belt 1 includes a plurality of connecting links 2 located centrally of the belt. These links are cooperatively related in a partially nested manner to form a pair of rows extending longitudinally of the path of movement of said belt. The belt further includes members for defining a conveying surface illustrated herein as a plurality of rods 4 spaced longitudinally of said path and extending transversely of said path.

The belt 1 is preferably driven in the direction of the arrow 6. If desired, however, the belt may also be driven in the opposite direction. As the belt traverses a straight portion or path of the conveyor course, the rods 4 are arranged in a generally parallel relation as illustrated in FIGURE 1. When, however, the belt traverses a curved path about a lateral or horizontal bend as illustrated in FIGURE 3, the rods 4 tend to radiate outwardly from the inside of the curved path. In so traversing such a curved path the ends 8 of the rods 4 at the outside of the curved path are more widely spaced than the ends 10 of the rods 4 disposed at the inside of the curved path. The ends 10 are in contiguous relationship and may be brought into contact with each other. Referring to FIGURE 4, the collapsible belt 1 is illustrated traversing a bend normal to the plane of the conveying surface about a sprocket wheel 12. The terms lateral bend within the general plane of the belt are employed herein as encompassing a lateral bend of the conveyor belt either in the exact horizontal plane of the conveying surface or in an inclined plane of the nature of that encountered in spiral or helical conveyor courses.

Referring to FIGURE 1, the connecting links 2, as illustrated, are generally U-shaped flat wires having a pair of opposed spaced leg members 14 interconnected by a base portion 16. At one end portion of each link 2 a slot 18 is defined through the link transversely of the path of movement of the belt. The slot 18 is elongated longitudinally of such path of movement. In the illustrated embodiment, the slot 18 is formed by a pair of opposed aligned slots 20, through each of the leg members 14. The slots 20 also extend into the base portion 16. In this manner, the rod 4 received through the slot 18 bears against the interior surface of the base portion 16 providing a maximum bearing surface area to insure maximum stress distribution.

Still referring to FIGURE 1, the connecting links 2 preferably define an aperture 22 through the end portion of link 2 opposite the slot, said aperture 22 extending transversely of the movement path. In the illustrated embodiment, the aperture 22 is defined by a pair of opposed aligned apertures 24, one of said apertures 24 being defined by each of the respective leg members 14.

Although the described construction is preferred, a collapsible belt for traversing vertical and lateral bends of a small radius can be constructed without the utilization of the aperture 22 through the connecting link 2 and a continuous rod 4. One rod may be disposed through the slot 18 in a link 2 and connected to the end portion of a next adjacent link to thereby provide the desired hinge or pivot pin with separate rods connected to the links for defining the conveying surface. In this regard and still referring to FIGURE 1, each of the rods 4 defines a central rod means 28 forming a pair of coupling members 30 each spanning the space between and secured to the leg members 14 of a respective link 2 by welding or the like. The central rod portion 28 also includes the connecting portion 34 connecting the side by side paired links 2 of the double row of links by welding or the like. The rods 4 further include a pair of outer rod means 36 extending in opposite directions transversely of the movement path for defining the conveying surface of the belt.

Referring to FIGURES 1 and 3, the connecting links 2 are disposed in one or more rows of links located centrally of the conveyor belt 1 and extending longitudinally of the movement path with the individual links 2 disposed in a partially nested relation. In this partially nested relation, the slot 18 and aperture 22 of adjacent nested links are aligned. This alignment permits the rod 4 to be received through the slot 18 of one link 2 and also through the aperture 22 of an adjacent link 2.

Preferably, there are provided two rows of connecting links with the individual links 2 of the respective rows disposed in paired relation aligned transversely of the movement path. In this manner, a link in one row may be secured to the aligned link in the second row with their slots 18 and apertures 22 also is aligned relation transversely of the movement path. The preference for two rows evolves from certain inaccuracies inherent in the operations employed for the formation of such links. These inaccuracies can result in a slight misalignment of the slots in the leg members 14. As such an inaccuracy tends to be repetitive throughout all of the links 2, the use of the links in side by side relation provides at least two pairs of aligned slots, each pair being comprised of a slot 18 from each link 2 thereby providing at least two aligned bearing points for the rods. The rods, therefore by bearing against such points in one slot of each link 2, are maintained by the links in a substantially parallel relation during movement.

As illustrated in FIGURES 1 and 3, the leg members 14 of the links 2 are preferably comprised of a plurality of stepped portions 38 disposed substantially parallel to each other and to the direction of the movement path. The stepped portions 38 on the opposed leg members 14 are spaced apart a relatively narrow distance at the base portion 16 and a relatively wide distance at the end of the leg members 14 opposite said base portion 16. As illustrated, the center stepped portion of one of each of the nested links 2 is in sliding relation with the outer wider stepped portion 38 of the adjacent link. As illustrated in FIGURE 1, when the links 2 are fully extended in driving position the rearward surface of the outer portion 38 engages the forward surface of the center portion 38. Upon longitudinal collapse of the belt 1, to produce areas of zero tension in the conveyor course, the portions 38 in sliding relation prevent the formation of lateral play in the links of the belt. The connecting link illustrated herein is of the nature of that disclosed in my United States Patent No. 3,225,898, issued on Dec. 28, 1965. As explained in that patent, the stepped connecting links allow a longitudinal collapse of the belt while maintaining lateral stability.

Referring to FIGURE 2, the central portion 28 of the rod 4 in offset relative to the end portions 36 such that the upper surface 40 of the connecting links 2 lies generally in the same plane as the upper surface 42 of the end portions 36 to thereby define a substantially level uniform conveying surface. It is contemplated that a similar result may be obtained by utilizing a rod 4 without the offset central portion 34 and employing a sleeve member on the portions 36 to compensate for the differences in the height of the elements. However, such additional elements would increase the production cost of the belt 1. When such a sleeve is employed it is considered a part of the rod. It will also be understood that stepped hollow rods or tubes may be employed.

Further the rods 4 may be constructed in a plurality of segments connected together end to end by sleeves or other connectors. For example, the outer ends 36 of the rods may be of carbon steel. The central portion 28 may be a stainless steel segment connected by end sleeves to the carbon steel outer ends. This construction is advantageous because the stainless steel segment will not be embrittled by the weld to the links whereas ordinary carbon still does tend to become embrittled by welding.

By constructing the conveyor belt 1 with the connecting links 2 disposed centrally of the belt with the rods 4 freely movable in the slot 18 of each of the nested links 2, the belt is capable of traversing a lateral bend of a relatively small turning radius as illustrated in FIGURE 3 and previously discussed. Moreover, the employment of a connecting link of the stepped construction centrally of the conveyor belt provides an advantageous combination of a belt capable of traversing sharp lateral bends and collapsing to provide areas in the conveyor course of zero tension while constantly maintaining lateral stability in the belt. Further, the use of such nested connected links with the continuous rods 4 extending through the aligned slots and apertures 22 provides a relatively simple belt structure having the aforestated capabilities. Further, such an uncomplicated structure facilitates the maintenance of the belt particularly the ease of cleaning to insure the sanitary condition of the belt such that it may be used in those industrial environments where various types of food goods are handled by the conveyor belt. Such construction also greatly facilitates the production of the belt itself.

I claim:
1. A conveyor belt comprising:
   a plurality of connecting links forming at least one row of links centrally of said belt, said row extending longitudinally of the path of movement of said belt, each of said links having opposed end portions, one of said end portions defining a slot therethrough transversely of said path, said slot being elongated longitudinally of said path, each of said links having a pair of spaced leg members extending generally longitudinally of said path and the links being arranged in partially nested relation with a portion of each link received between the leg members of an adjacent link;
   rod means spaced along the belt and each having a central portion with an axis parallel to the plane of the belt for pivotably and slidably coupling each partially nested pair of adjacent links, said central portion being connected to one link of said pair of links at the end portion opposite said slot and being received through the slot of the other link of said pair to couple said links together in said row whereby said links are pivotable relative to each other about the axis of said central rod portion to allow the belt to bend in a direction normal to the plane of the belt and said central rod portion are slidable longitudinally of the belt in said slots to allow the belt also to bend laterally within the general plane of the belt and said rod means having outer portions spaced along the belt and connected to said links to extend freely outwardly in both lateral directions from said central links to form the conveying surface of the belt outwardly of said links so that the outer ends of said outer rod portions are spaced apart during straight belt travel and may be collapsed into contiguous relationship during said lateral bending of the belt.

2. A conveyor belt as recited in claim 1 wherein said links are generally U-shaped defining a pair of opposed spaced leg members and a base portion connecting said leg members, and wherein said elongated slot is comprised of a pair of aligned elongated openings defined respectively by said opposed leg members.

3. A conveyor belt as recited in claim 2 wherein each of the leg members of each of the links defines an aperture therethrough transversely of said path of movement, said apertures of the leg members of each link being aligned with one another and with the slot of the adjacent partially nested link, and wherein the central rod portion and the outer rod portions are both defined at each link by a rod member extending transversely of said path of movement continuously from edge to edge of the belt, said rod members being received through the aligned slots and apertures and connected to the link defining said apertures.

4. A conveyor belt as recited in claim 3 wherein each of said rod members is composed of a single integral rod.

5. A conveyor belt as recited in claim 3 wherein each of said rod members has its central portion offset in a direction normal to the plane of the belt from its outer portions which define said outer rod means, so that the upper surface of the links and the upper surface of the outer portions of the rods are in substantially the same plane to provide a susbtantially uniform conveying surface.

6. A conveyor belt as recited in claim 3 wherein each of the leg members of each of said links has a plurality of stepped portions parallel to said path, the stepped portions on opposed leg members being spaced apart a relatively narrow distance at the base portion and a relatively wide distance at the ends of the leg members opposite said base portion, said links being arranged in said partially nested relation with the narrow stepped portions of respective ones of said links being received in close sliding relation with the wide stepped portions of the next adjacent link.

7. A conveyor belt as recited in claim 6 wherein two rows of said connecting links are provided centrally of said belt with the links of the respective rows in paired relation and having the slots and apertures of the leg members of said paired links in aligned relation wherein each of said rod members is received through the aligned slots and apertures of the paired links of the respective rows.

8. A conveyor belt comprising:
 a plurality of connecting links forming a plurality of adjacent rows of links centrally of said belt, each row extending longitudinally of the path of movement of said belt, each of said links having opposed end portions, one of said end portions defining a slot therethrough transversely of said path, said slot being elongated longitudinally of said path, each of said links having a pair of spaced leg members extending generally longitudinally of said path and the links in each row being arranged in partially nested relation with a portion of each link received between the leg members of an adjacent link;
 rod means spaced along the belt and each having a central portion with an axis parallel to the plane of the belt for pivotably and slidably coupling each partially nested pair of adjacent links, said central portion being connected to one link of said pair of links in each of said rows at the end portion opposite said slot and being received through the slot of the other link of said pair in each of said rows to couple said links together in each row whereby said links in each pair are pivotable relative to each other about the axis of said central rod portion to allow the belt to bend in a direction normal to the plane of the belt and said central rod portions are slidable longitudinally of the belt in said slots to allow the belt also to bend laterally within the general plane of the belt and said rod means having outer portions extending freely outwardly in both lateral directions from said rows of central links to form the conveying surface of the belt outwardly of said rows of links so that the outer ends of said outer rod portions are spaced apart during straight belt travel and may be collapsed into contiguous relationship during said lateral bending of the belt.

9. A conveyor belt as recited in claim 8 wherein said connecting links form two adjacent rows of links.

10. A conveyor belt as recited in claim 9 wherein each of said rod means is composed of a single integral rod.

11. A conveyor belt comprising:
 a plurality of connecting links forming a plurality of adjacent rows of links centrally of said belt, each row extending longitudinally of the path of movement of said belt, each of said links having opposed end portions, one of said end portions defining a slot therethrough transversely of said path, said slot being elongated longitudinally of said path, each of said links having a pair of spaced leg members extending generally longitudinally of said path and the links in each row being arranged in partially nested relation with a portion of each link received between the leg members of an adjacent link;
 a plurality of rod members spaced along the belt and each having a central portion with an axis parallel to the plane of the belt for pivotably and slidably coupling each partially nested pair of adjacent links, each rod member having a central rod portion connected to one link of said pair of links in each of said rows at the end portion opposite said slot and being received through the slot of the other link of said pair in each of said rows to couple said links together in each row whereby said links in each pair are pivotable relative to each other about the axis of said central rod portion to allow the belt to bend in a direction normal to the plane of the belt and said central rod portions are slidable longitudinally of the belt in said slots to allow the belt also to bend laterally within the general plane of the belt and said rod member having outer portions spaced along the belt extending freely outwardly in both lateral directions from said rows of central links to form the conveying surface of the belt outwardly of said links so that the outer ends of said outer rod means are spaced apart during straight belt travel and may be collapsed into contiguous relationship during said lateral bending of the belt.

12. A conveyor belt as recited in claim 10 wherein said connecting links form two adjacent rows of links.

References Cited

UNITED STATES PATENTS

| | | | |
|---|---|---|---|
| 2,800,218 | 7/1957 | Drouin | 198—182 |
| 3,094,206 | 6/1963 | Stewart | 198—181 |
| 3,225,898 | 12/1965 | Roinestad | 198—181 |

RICHARD E. AEGERTER, Primary Examiner